United States Patent [19]

Kassai

[11] Patent Number: 4,565,388
[45] Date of Patent: Jan. 21, 1986

[54] STRUCTURE FOR CONNECTING A HANDLE TO THE PUSH RODS OF A BABY CARRIAGE

[75] Inventor: Kenzou Kassai, Osaka, Japan
[73] Assignee: Kassai Kabushikikaisha, Osaka, Japan
[21] Appl. No.: 597,727
[22] Filed: Apr. 6, 1984
[30] Foreign Application Priority Data
  Apr. 8, 1983 [JP] Japan ............................. 58-52838[U]
[51] Int. Cl.$^4$ ............................................. B62B 7/06
[52] U.S. Cl. ..................................... 280/644; 16/331; 280/42; 280/650; 297/45
[58] Field of Search ................. 280/641, 642, 644, 42, 280/647, 650, 658, 47.4; 297/45, 42, DIG. 4, 183; 16/326, 331, 332, 348, 360

[56] References Cited

U.S. PATENT DOCUMENTS

| | | | |
|---|---|---|---|
| 2,578,153 | 12/1951 | Schmitz | 16/331 X |
| 2,651,053 | 9/1953 | Rowe et al. | 16/326 X |
| 4,317,581 | 3/1982 | Kassai | 280/650 X |
| 4,362,315 | 12/1982 | Kassai | 280/650 |

Primary Examiner—John A. Pekar
Assistant Examiner—Michael Mar
Attorney, Agent, or Firm—W. G. Fasse; D. H. Kane, Jr.

[57] ABSTRACT

A structure for connecting a handle to the push rods of a baby carriage is located between the push rods of a pair of push rods (1) and the handle for allowing the widening and narrowing of the distance between the push rods (1) in response to opening or closing the baby carriage. The distance between the push rods (1) in the open state, is firmly maintained in that the connecting sections between the push rods (1) and the push rod-connecting rod (2) are locked. This locking of each connecting section is achieved when a locking sleeve (10) is displaced downwardly by the force of a spring (15), whereas it is canceled when the locking sleeve (10) is displaced upwardly against the force of the spring (15).

6 Claims, 10 Drawing Figures

FIG. 3
FIG. 4
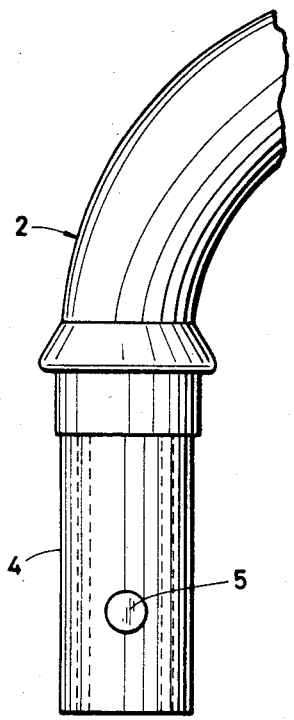
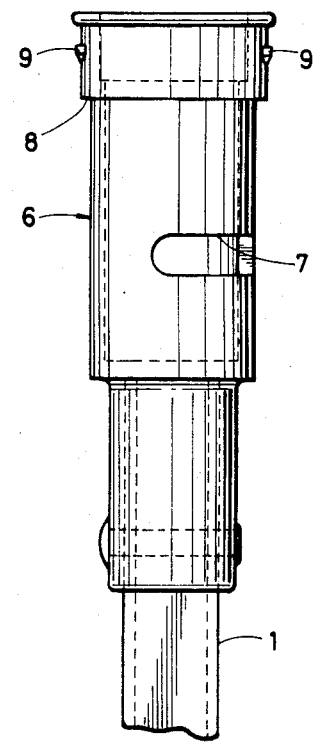

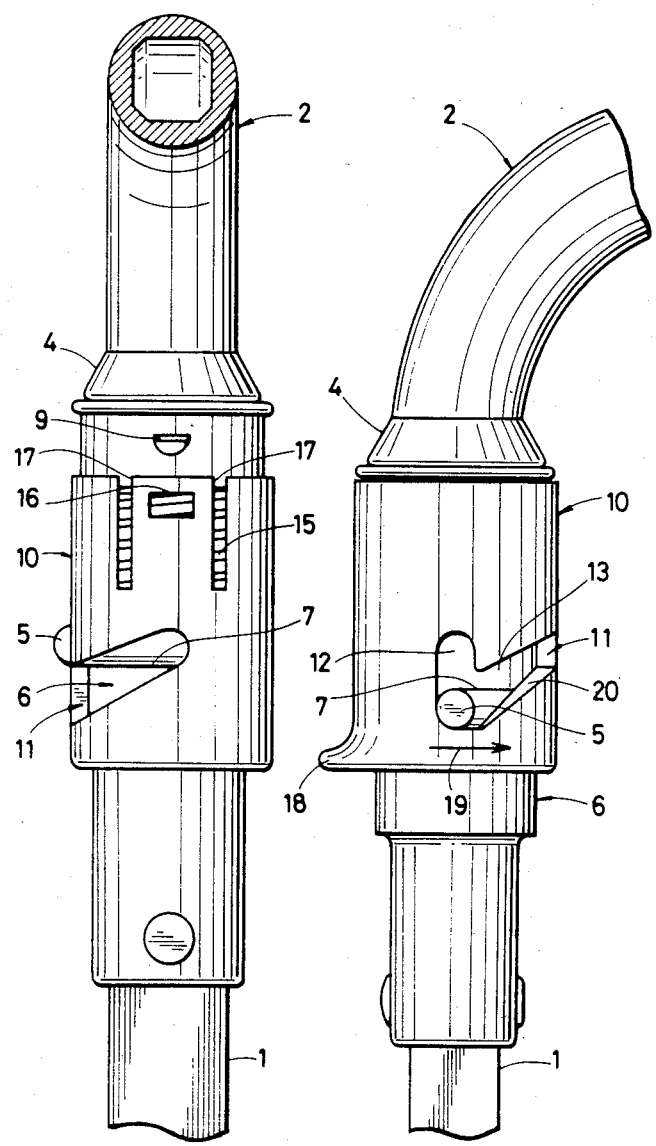

STRUCTURE FOR CONNECTING A HANDLE TO THE PUSH RODS OF A BABY CARRIAGE

BACKGROUND OF THE INVENTION

This invention relates to a structure for connecting a handle to the push rods of a baby carriage. The handle between a pair of push rods is referred to as a push rod-connecting rod herein and is connected to and between said push rods. More particularly the invention relates to a construction for the connecting sections of a collapsible baby carriage wherein the distance between the push rods is widened and narrowed when the baby carriage is opened or closed. Such a connecting structure must fix the distance between the push rods in the open state by locking the connecting sections between the push rods and the push rod-connecting rod or handle.

There have been proposed various types of folding actions for collapsible baby carriages, and a typical one is as follows. It is usual for a baby carriage to have a push rod for pushing and steering the baby carriage, and in most cases where a pair of such push rods is provided on opposite sides, a push rod-connecting rod or handle extending in the direction of the width of the baby carriage is connected between the push rods. In foldable baby carriages the construction is such, that the spacing between the push rods of a pair of push rods is maintained at a predetermined spaced relation when the baby carriage is open and when the latter is closed such spacing is narrowed. In this case, the push rod-connecting rod is foldable in at least one place in its middle region, the folding operation allowing the change of the spacing of the push rods in the open and closed states of the baby carriage, please see my U.S. Pat. No. 4,317,581.

In order to firmly maintain the open state of the baby carriage, it is only necessary to prevent the push rod-connecting rod or handle from folding by a locking mechanism applied to resist any action in the folding direction of the push rod-containing rod.

SUMMARY OF THE INVENTION

Accordingly, it is an object of this invention to provide a structure for the connecting sections between the push rods and the push rod-connecting rod of a baby carriage wherein a locking device resists the folding of said push rod-connecting rod.

According to the invention, the upper end of each push rod is formed as an upwardly open cylinder, in which the associated end portion of the push rod-connecting rod is inserted. In this inserted state, each end portion of the push rod-connecting rod is turnable around the axis of the associated cylinder. To allow this turning movement, the lateral wall of each cylinder is formed with an elongated throughgoing hole extending circumferentially over a predetermined angular range, while each end of the push rod-connecting rod is provided with a guide pin received in said elongated throughgoing hole. The guide pins have a length such that they project outwardly through the throughgoing holes.

With the push rods and push rod-connecting rod thus combined, locking sleeves are provided, each surrounding the associated cylinder so that it is movable axially of the cylinder. That is, the locking sleeves do not rotate relative to the cylinders. Such arrangement can be easily realized, for example, by making the contour of the inner peripheral surface of the locking sleeve and the contour of the outer peripheral surface of the cylinder noncircular. Each locking sleeve is formed with an elongated hole passage for receiving the aforesaid pin. Such elongated hole passage comprises a vertically extending locking portion, and a guide portion extending obliquely upwardly from the lower end of said locking portion. The elongated hole passage has a curved form as a whole.

A spring is inserted between the cylinder and the locking sleeve, whereby the latter is urged downwardly relative to the cylinder. An anchoring mechanism is provided for temporarily anchoring the locking sleeve to the cylinder when the locking sleeve is moved upwardly to the upper limit of its travel against the force of said spring. Such anchoring mechanism may comprise a combination of a projection formed on either the cylinder or the locking sleeve and a recess formed in the other member for receiving said projection.

Therefore, in the open state of the baby carriage, when the guide pin is positioned at the upper end of the locking portion of the aforesaid elongated hole passage, the rotation of each end portion of the push rod-connecting rod relative to the associated cylinder is inhibited since each guide pin fits in the locking portion of the associated elongated hole passage, thus making it impossible for the locking sleeve to turn around the axis relative to the cylinder and hence the push rod. This fixed state of the locking sleeve preventing its rotation also inhibits the rotation of each end portion of the push rod-connecting rod or handle. Therefore, the open state of the baby carriage is locked.

In this open state, the locking sleeve is moved upwardly against the force of said spring, whereby this open state is maintained by the anchoring mechanism, while the guide pin is positioned at the lower end of the locking portion of the elongated hole passage, and the rotation of each end portion of the push rod-connecting rod relative to the cylinder is allowed. When the open baby carriage is to be closed or folded the following operation takes place. Each end portion of the push rod-connecting rod is turned relative to the cylinder and when the guide pin is passed in the guide portion of the elongated hole passage during this turning movement, the guide pin moves the locking sleeve downwardly with a force sufficient for contacting the lower side of the guide portion, thereby canceling the anchoring imposed by the anchoring mechanism, whereby the locking sleeve is urged downwardly by the action of the spring.

Therefore, when the open state is to be re-established, the guide pin is moved in the elongated hole passage while contacting the upper side of the guide portion of the elongated hole passage, and when it finally comes to the locking portion, the locking sleeve is moved downwardly by the spring force and the guide pin is positioned at the upper end of the locking portion, whereby the open state is locked again.

According to this invention, the state in which the rotation of each end portion of the push rod-connecting rod relative to the push rod is allowed and the state in which it is inhibited can be selected by the positional relation between the elongated hole passage formed in the locking sleeve and the guide pin provided in each end portion of the push rod-connecting rod. Due to the combination of the spring installed between the cylinder and locking sleeve, the anchoring mechanism, the curved elongated hole passage formed in the locking sleeve, and the guide pin provided on the locking sleeve, the open state of the baby carriage can be attained by moving each locking sleeve upwardly. If the open baby carriage is to be closed again, the baby carriage is automatically brought into a state in which it can be locked. However, when the closed state is changed again to the open state, the final opening step automatically locks the carriage in its open state. The locked open state is maintained, since the spring always forces the locking mechanism into the locked state, unless an intentional force is applied from the outside. In the absence of such a force, the baby carriage is prevented from accidentally changing from its open to the closed state.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3 to 5 are exploded views of the components of a connecting section C shown in FIGS. 1 and 2, of which FIG. 3 shows one end portion 4 of a push rod-connecting rod 2, FIG. 4 shows the upper end of a push rod 1, and FIG. 5 shows a locking sleeve 10;

FIGS. 8 to 10 respectively show the portions shown in FIG. 6, of which FIG. 8, like FIG. 6, shows the open and locked state of the baby carriage in a view taken from the inside of the baby carriage, FIG. 9 shows the open and unlocked state of the baby carriage in a view taken from the back of the baby carriage, and FIG. 10 shows the closed state of the baby carriage as seen from its back.

DESCRIPTION OF THE PREFERRED EMBODIMENTS

Figure 1:
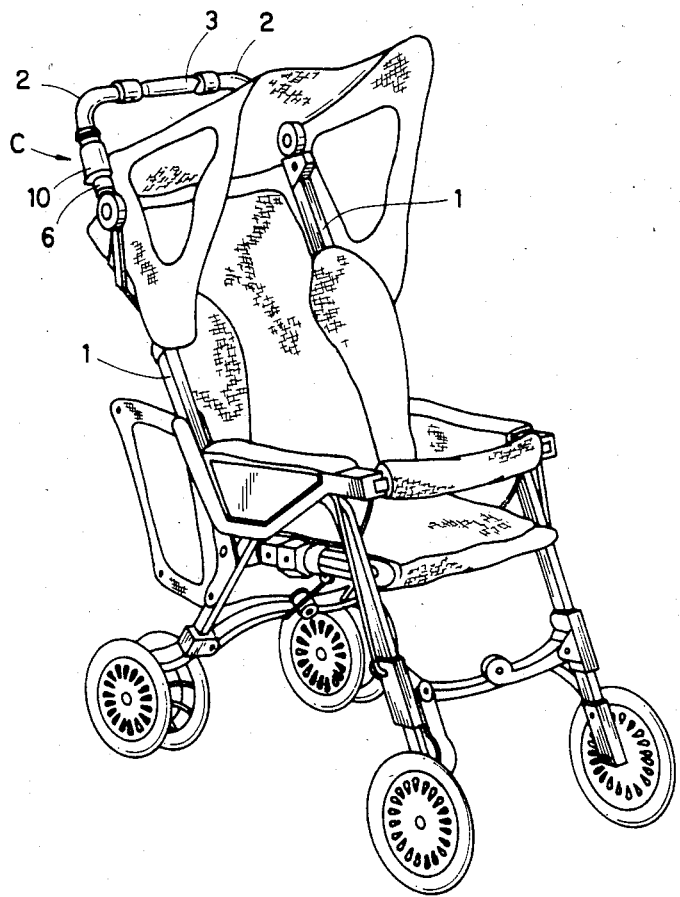
FIG. 1 is a perspective view showing the open state of a baby carriage according to an embodiment of this invention.
Figure 2:
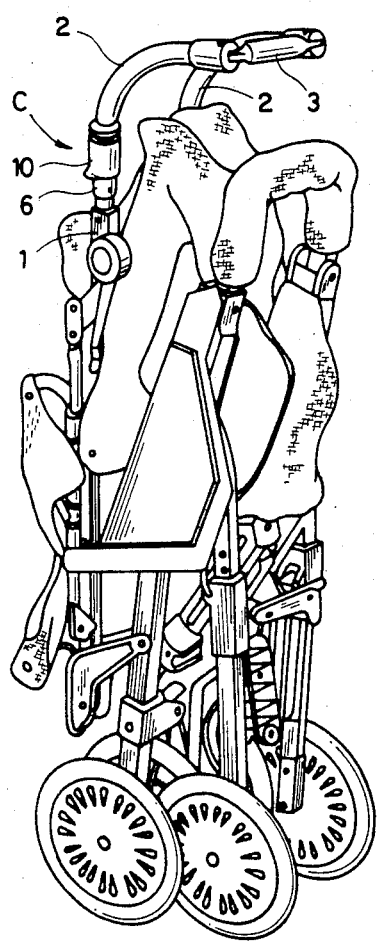
FIG. 2 is a perspective view showing the closed state of the baby carriage of FIG. 1.

The basic construction of the baby carriage shown in FIGS. 1 and 2 is disclosed in U.S. Pat. No. 4,317,581 corresponding to European Patent Application No. 80303590.6.

FIGS. 1 and 2 show a typical example of a baby carriage wherein this invention is used. The carriage has a pair of push rods 1 interconnected by a push rod-connecting rod 2. In the open state of the baby carriage, as shown in FIG. 1, the push rods 1 are spaced from each other by a predetermined distance. When the baby carriage is closed, as shown in FIG. 2, said distance is narrowed. The push rod-connecting rod 2 is foldable in at least one place in the middle. In this embodiment, the push rod-connecting rod 2 has a middle portion 3 and two end portions 4 connected to the opposite ends of the middle portion 3. The middle portion 3 and the end portions 4 are connected together by pins for changing the unfolded state of FIG. 1 to the folded state of FIG. 2. A change in the distance between the push rods in the open and closed states is allowed by such folding of the push rod-connecting rod 2.

In FIGS. 1 and 2, the portion shown at C is the connecting section between the push rod 1 and the push rod-connecting rod 2, and the invention is characterized by the construction of this connecting section C.

Figure 7:
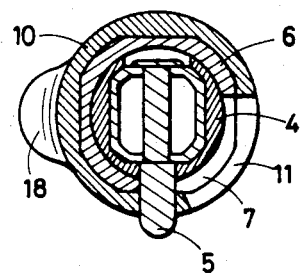
FIG. 7 is a sectional view taken along the line A—A of FIG. 6.

Referring to FIGS. 1 to 7, the end portion 4 of the push rod-connecting rod 2 shown in FIG. 3 includes a vertically extending portion provided with a guide pin 5 projecting therefrom. The vertically extending portion of the end portion 4, as best shown in FIG. 7, has a circular contour in its outer peripheral surface.

As shown in FIG. 4, the upper end portion of the push rod 1 is formed with a cylinder 6 having an open top to receive the end portion 4 of the push rod-connecting rod 2. The lateral wall of the cylinder 6 has a throughgoing elongated hole 7 circumferentially extending over an angular range of about 90 degrees. The inner peripheral surface of the cylinder 6 has a shape similar to that of the outer peripheral surface of the end portion 4 of the push rod-connecting rod 2, and as best shown in FIG. 7, when the end portion 4 is inserted in the cylinder 6, the guide pin 5 extends through the throughgoing elongated hole 7 and projects outwardly. The inner peripheral surface of the cylinder 6 also has a circular contour, and the end portion 4, received in the cylinder 6, is capable of turning around the axis of the cylinder 6. In this embodiment, however, the turning movement of the end portion 4 is limited to an angular range of about 90 degrees by the guide pin 5 cooperating with the throughgoing elongated hole 7. The outer peripheral surface is formed with a step 8 having a downward surface. For example, two projections 9 are disposed above the step 8. The contour of the outer peripheral surface of the cylinder 6 is not circular, as shown in FIG. 7.

Figure 5:
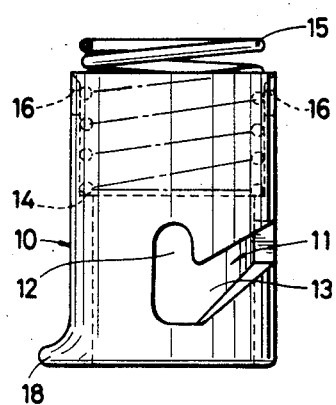
Figure 6:
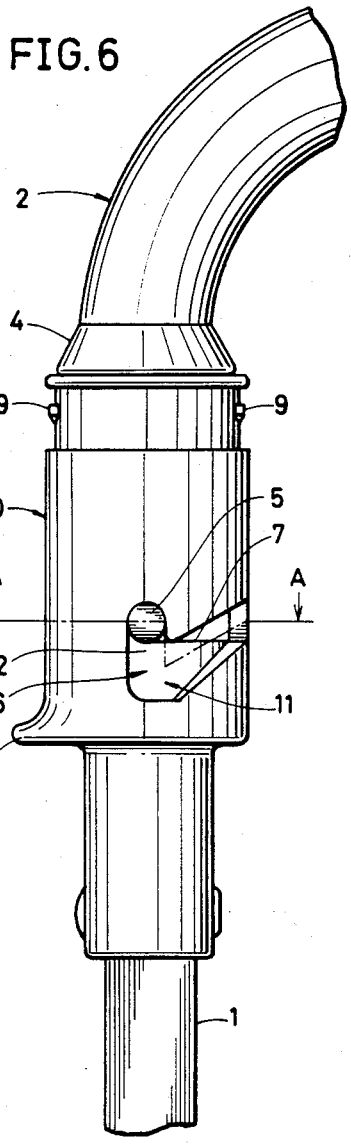
FIG. 6 shows the open and locked state of the baby carriage whereby the components shown in FIGS. 3 to 5 are shown in the assembled state in a view taken from the back of the baby carriage.

The locking sleeve 10 shown in FIG. 5 surrounds the cylinder 6 as shown in FIG. 6. The contour of the inner peripheral surface of the locking sleeve 10 is similar to the contour of the outer peripheral surface of the cylinder 6 and hence it is not circular.

As a result, the locking sleeve 10 is movable relative to the cylinder 6 only in the direction of the longitudinal axis. The locking sleeve 10 has a curved elongated hole passage 11 which comprises a vertically extending locking portion 12 and a guide portion 13 extending obliquely upwardly from the lower end of said locking portion 12. The elongated hole passage 11 receives the aforesaid guide pin 5. The inner peripheral surface of the locking sleeve 13 is formed with a step 14 having an upward surface. A spring 15 rests on said step 14, while the upper end of the spring 15 abuts against the step 8 of the cylinder 6 in the assembled state. The lateral wall of the locking sleeve 10 has recesses 16 cooperating with the aforesaid projections 9 to form an anchoring mechanism. In this embodiment, each recess 16 is provided by a hole extending through the lateral wall of the locking sleeve 10. It is preferable to form slits 17 on both sides of each recess 16, as shown in FIG. 8. That is, if the locking sleeve 10 is made, e.g., of synthetic resin, it becomes easy for the portion positioned between the slits 17 to deform elastically, whereby engagement between the projection 9 and the recess 16 is facilitated, as will be described below. An operating knob 18 extends laterally from the locking sleeve 10 for upwardly moving the locking sleeve.

As shown in FIGS. 6 to 8, when the end portion 4 of the push rod-connecting rod 2, the cylinder 6, and the locking sleeve 10 are assembled, the spring 15 is disposed between the step 8 of the cylinder 6 and the step 14 of the locking sleeve 10 for urging the locking sleeve 10 axially downwardly on the cylinder 6 at all times.

The operation of the aforesaid connecting section will now be described.

First, in the open state of the baby carriage as shown in FIG. 1, the parts are in the state shown in FIGS. 6 to 8. That is, the guide pin 5 is positioned at the upper end of the locking portion 12 of the elongated hole passage 11. In this state, the locking sleeve 10 is at a relatively lower position, where the locking sleeve 10 is held in its position by the action of the spring 15. In this state, a relative rotation between the guide pin 5 and the locking sleeve 10 is inhibited. Since the guide pin 5 is fixed to the end portion 4 of the push rod-connecting rod 2, it follows that the relative rotation between the end portion 4 of the push rod-connecting rod 2 and the locking sleeve 10 is inhibited. Since the locking sleeve 10 and cylinder 6 are capable of moving only axially, there should be no rotative movement between the locking sleeve 10 and cylinder 6, so that there is no relative rotation between the locking sleeve 10 and the push rod-connecting rod 2. As is clear from such series of mechanisms, the end portion 4 of the push rod-connecting rod 2 and the push rod 1 cannot rotate relative to each other and hence the open state of the baby carriage is locked.

When it is desired to unlock the open state and fold the baby carriage into the closed state, the following operations are performed. First, the locking sleeve 10 is upwardly moved using the operating knob 18. This upward movement is effected against the force of the spring 15. When the locking sleeve 10 reaches the end of the upward movement, the projection 9 fits in the recess 16 as shown in FIG. 9, whereby the projection 9 and the recess 16 maintain this folded or closed state in spite of the action of the spring 15.

In the closed state of FIG. 9, the guide pin 5 is positioned at the lower end of the locking portion 12 of the elongated hole passage 11 and hence the way for the guide pin 5 leads to the guide portion 13, allowing the guide pin 5 to move relative to the locking sleeve 10 in the direction of arrow 19. The movement of the guide pin 5 in the direction of arrow 19 takes place when the push rod-connecting rod 2 is folded or, in other words, when the baby carriage is closed.

When the baby carriage is to be closed, the end portion 4 of the push rod-connecting rod 2 is rotated relative to the push rod 1 in the direction corresponding to the direction of arrow 19. In response to this rotation, the guide pin 5 is moved in the direction of arrow 19 and passes through the guide portion 13 of the elongated hole passage 11. Since the guide portion 13 extends obliquely upward, the movement of the guide pin 5 forces the locking sleeve 10 downwardly while contacting the lower side 20 of the guide portion 13. As a result, the anchoring imposed by the anchoring mechanism comprising the projections 9 and recesses 16 is canceled, whereupon the locking sleeve 10 tends to move downwardly under the action of the spring 15.

Figure 10:
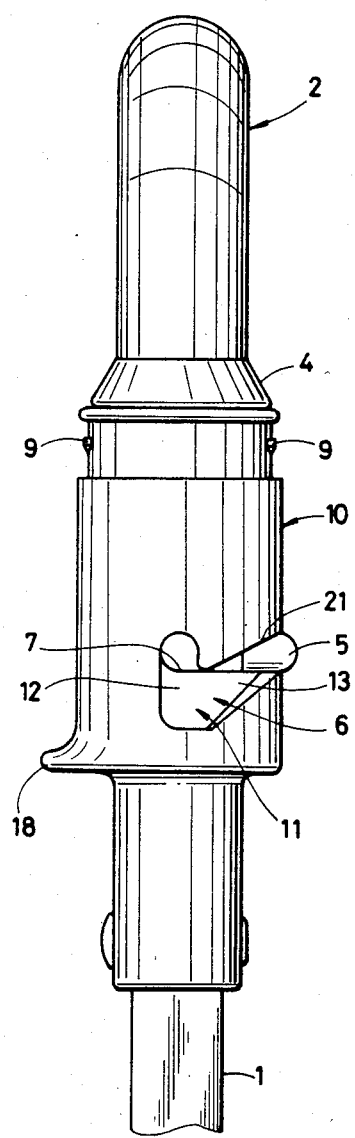

When the baby carriage is closed as shown in FIG. 2, the guide pin 5 reaches the terminal end of the guide portion 13 of the elongated hole passage 11 as shown in FIG. 10.

When it is desired to open the baby carriage again, the end portion 4 of the push rod-connecting rod 2 is rotated relative to the push rod 1. In the course of this rotation, the guide pin 5 moves in the elongated hole passage 11 while contacting the upper side 21 (FIG. 10) of the guide portion 13. In this case, the locking sleeve 10 moves upwardly against the force of the spring 15 but not to the extent that the projections 9 engage the recesses 16. When the guide pin 5 approaches the locking portion 12, the locking sleeve 10 is moved downwardly by the spring 15. In response thereto, the guide pin 5 is positioned again at the upper end of the locking portion 12. Thus, the open state of the baby carriage is obtained again and this open state is automatically locked.

In the embodiment described above, the elongated throughgoing hole 7 extends over an angular range of about 90 degrees, and the range of rotation of the end portion 4 of the push rod-connecting rod 2 relative to the cylinder 6 is also limited to about 90 degrees. However, this arrangement is not absolutely necessary, and the same function can be achieved by using only the elongated hole passage 11.

The foregoing description of the embodiment refers to only one push rod 1 and one end portion 4 of the push rod-connecting rod 2, but it is to be understood that the right-hand and left-hand side arrangements are symmetrical and that the same operation proceeds also on the other side.

Further, the application of the structure for the connecting sections according to this invention is not limited to the baby carriage the overall construction of which is shown in FIGS. 1 and 2, but is also applicable to other baby carriages provided they have a pair of push rods and a foldable push rod-connecting rod which is interposed between said push rods to connect them.

Although the present invention has been described and illustrated in detail, it is clearly understood that the same is by way of illustration and example only and is not to be taken by way of limitation, the scope of the present invention being limited only on the term of the appended claims.

What is claimed is:

1. In a structure for connecting a handle to push rods of a baby carriage for maintaining a predetermined distance between said push rods when the baby carriage is in the open state said distance being narrower when the baby carriage is in the closed state, said handle forming a push rod-connecting rod (2) which is foldable in at least one place in a middle portion (3) thereof for changing said distance between the push rods (1) by a folding action of said push rodconnecting rod, the improvement comprising, an upwardly open cylinder (6) at each upper end of each of said push rods (1), an elongated throughgoing hole (7) extending over a predetermined angular range through a lateral wall of said upwardly open cylinder, said push rod-connecting rod (2) having two end portions (4) inserted in said respective cylinder (6) whereby said end portion is capable of rotating around a longitudinal axis of said cylinder (6), each end portion (4) of said push rod-connecting rod (2) comprising a guide pin (5) extending through said elongated throughgoing hole (7) to project outwardly, a locking sleeve (10) surrounding said cylinder and movable relative to said cylinder (6) only in the direction of said longitudinal axis, said locking sleeve (10) comprising an elongated hole passage (11) having a vertically extending locking portion (12) and a guide portion (13) extending obliquely upwardly from a lower end to an upper end of said locking portion (12), said elongated hole passage (11) receiving said guide pin (5), a spring (15) interposed between said cylinder (6) and said locking sleeve (10) for constantly urging said locking sleeve (10) downwardly relative to said cylinder (6), an anchoring mechanism (9, 16) for temporarily anchoring said locking sleeve (10) to said cylinder (6) when said locking sleeve (10) is moved upwardly against the force of said spring (15) to an upper end position , whereby in an open state of the baby carriage, when said guide pin (5) is positioned at said upper end of said locking portion (12) of said elongated hole passage (11), the rotation of each end portion (4) of said push rod-connecting rod (2) relative to said cylinder (6) is inhibited for locking the baby carriage in its open state, in which said locking sleeve (10) is maintained in an upward position by said anchoring mechanism, and wherein, when said guide pin (5) is positioned at said lower end of said locking portion (12) of said elongated hole passage (11), each end portion (4) of said push rod-connecting rod (2) is rotatable relative to said cylinder (6) for closing said baby carriage, whereby said guide pin (5) passes through said guide portion (13) of said elongated hole passage (11) for moving said locking sleeve (10) downwardly while said guide pin (5) is contacting a lower side of said guide portion (13) thereby canceling the locking imposed by said anchoring mechanism (9, 16), and wherein, for opening said baby carriage, said guide pin (5) moves in said elongated hole passage (11) while contacting an upper side of said guide portion (13) of said elongated hole passage (11) until said guide pin approaches said locking portion (12), whereupon said spring (15) moves said locking sleeve (10) downwardly for positioning said guide pin (5) at the upper end of said locking portion (12) to thereby lock the baby carriage in the open state.

2. The structure of claim 1, wherein said anchoring mechanism includes a projection (9) and a recess (16) for receiving said projection (9).

3. The structure of claim 1, wherein said locking sleeve (10) comprises a pair of slits (17), and wherein said anchoring mechanism is positioned in a region between said slits (17).

4. The structure of claim 1, wherein contours of an outer peripheral surface of said cylinder (6) and of an inner peripheral surface of said locking sleeve (10) are similar to each other and non-circular.

5. The structure of claim 2, wherein said projection (9) is provided on said cylinder (6) and said recess is provided on said sleeve (10).

6. The structure of claim 2, wherein said projection (9) is provided on said sleeve (10) and said recess is provided on said cylinder (6).

* * * * *